United States Patent [19]

Müller et al.

[11] 4,286,994
[45] Sep. 1, 1981

[54] METHOD FOR THE USE OF THE GYPSUM OCCURRING IN FLUE GAS DESULFURIZING INSTALLATIONS, OPERATED ON A LIME BASIS

[75] Inventors: Rudolf Müller, Friedrichsthal; Hans-Guido Klinkner, St. Ingbert; Günter Culmann, Neunkirchen, all of Fed. Rep. of Germany

[73] Assignee: Saarbergwerke A.G., Saarbrucken, Fed. Rep. of Germany

[21] Appl. No.: 62,074

[22] Filed: Jul. 30, 1979

[30] Foreign Application Priority Data

Jun. 29, 1978 [DE] Fed. Rep. of Germany ....... 2833382

[51] Int. Cl.³ ............................................. C04B 11/00
[52] U.S. Cl. ..................................... 106/109; 106/110
[58] Field of Search ................. 106/109, 110; 423/555

[56] References Cited

U.S. PATENT DOCUMENTS 3,855,391  12/1974  Selmeczi et al. ..................... 106/110

*Primary Examiner*—James Poer
*Attorney, Agent, or Firm*—James C. Wray

[57] ABSTRACT

Method for the use of flue gas desulfurizing gypsum occurring in flue gas desulfurizing installations operated on a lime basis, characterized by mixing the flue gas desulfurizing gypsum with dehydrated natural gypsum after its partial or complete dehydration.

5 Claims, No Drawings

METHOD FOR THE USE OF THE GYPSUM OCCURRING IN FLUE GAS DESULFURIZING INSTALLATIONS, OPERATED ON A LIME BASIS

The invention concerns a method for the use of flue gas desulfurization gypsum occurring in flue gas desulfurizing installations which are operated on a lime basis.

The flue gases of coal and oil furnaces contain a series of harmful materials, especially sulfuric oxides, which, when they get into the atmosphere, lead to great damage to the environment. It is therefore necessary to separate the harmful materials from the flue gases.

Different flue gas desulfurizing methods are known for the separation of sulfuric oxides. Some of them operate with an aqueous wash liquid containing calcium ions, which is brought with the flue gases in the material exchange. First calcium sulfite or calcium bisulfite occurs, which is then oxidized in the presence of oxygen to calcium sulfate. An aqueous calcium sulfate slurry (gypsum slurry) occurs as the end product of the smoke gas or flue gas desulfurizing installation, which is conducive to the environment, however, the storage of which causes problems.

Experiments in which the gypsum occurring in the gypsum phase "dihydrate" ($CaSO_4.2H_2O$) dehydrates to semihydrate ($CaSO_4.\frac{1}{2}H_2O$) or to anhydrite ($CaSO_4$) and then were set with water, showed that the strength values of the set flue gas desulfurizing gypsum are poorer than those of commercial natural gypsum. This applies for the bending strength as well as for the compressive strength. Primarily this may be attributable to the fact that in the case of smoke gas desulfurization gypsum, the scattering amount determined according to DIN 1168 of March 1955, Page 2, Section 2.5, is smaller than in the case of natural gypsum; or the water: gypsum ratio (W:G) is greater in the case of flue gas desulfurization gypsums with otherwise comparable rheological properties than in the case of commercial natural gypsum.

The invention is based on the task of developing a method which makes it possible to use the gypsum occurring in flue gas desulfurizing installations on a lime basis in a technically logical and economical manner.

The problem is solved according to the invention by mixing the flue gas desulfurization gypsum after its partial and/or complete dehydration with dehydrated natural gypsum.

It has been shown that a gypsum mixture manufactured according to the method of the invention from natural gypsum and flue gas desulfurization gypsum can also be very well processed with a conventional water: gypsum ratio (e.g. W:G=0.625) which is only used for the processing of natural gypsum. This is not the case with the processing of flue gas desulfurizing gypsum at comparable W:G-ratios.

As has been shown, surprisingly, the strength values of set mixtures from natural gypsum and smoke gas desulfurizing gypsum at the same W:G ratio even lies substantially higher than in the case of natural gypsums alone, due to which we have the possibility of using gypsum products in the building industry or in mining, for example for the erection of walls and dikes in the underground area or expanded for the filling of hollow spaces.

There is the additional advantage that even the flow properties of a gypsum slurry are positively influenced by the mixing in of flue gas desulfurizing gypsum. Experiments have shown that the viscosity of a gypsum slurry determined at a shearing gradient of $D=22.5$ $S^{-1}$ with W:G=0.625 increases linearly with an increasing fraction of flue gas desulfurizing gypsum. The initial flow limit and the residual flow limit show such a behavior.

Thus it is possible by means of the invention to intentionally change the rheological properties of a gypsum slurry by the partial replacement of natural gypsum by smoke gas desulfurization gypsum and thus produce products which distinguish themselves compared to natural gypsums by better adhesion properties.

According to the invention, the flue gas desulfurization gypsum, which exists first as dihydrate ($CaSO_4.2H_2O$) is advantageously dehydrated on the spot to a semihydrate and/or anhydrite and then mixed with the natural gypsum. In this case cheap waste heat can be used from the power plant area for dehydrating.

But it is also possible that the flue gas desulfurization gypsum is mixed with natural gypsum in the form of dihydrate, whereby the dehydration of natural gypsum and smoke gas desulfurizing gypsum can then take place in a common installation.

The fraction of smoke gas desulfurization gypsum in the mixture advantageously lies between about 5 and 50 wt.%. Higher smoke gas desulfurization gypsum concentrations lead to processing difficulties of the gypsum product at W:G ratios smaller than or equal to 0.625 for reasons of strength and even with the aid of liquifiers.

Preferably, the smoke gas desulfurization gypsum fraction in the mixture lies between about 5 and 30 wt.%, where it has proven advantageous at concentrations over 15 wt.% to add a liquifier to the mixing water. The concentration of the liquifier lies at about 1 and 3 wt.% relative to the amount of mixing water.

A setting retarder may be added to the gypsum mixture before or during the stirring of the mixture in with the mixing water.

Further explanations to the invention are to be found in the test results given in the following table.

| Composition of the gypsum mixture (wt. %) | | Water gypsum ratio | Liquifier content in mixing water (wt. %) | Strength characteristics | |
|---|---|---|---|---|---|
| Mining gypsum | Weiher-semi-hydrate | | | Bending strength (da N/cm²) | Comp. strength (da N/cm²) |
| 0 | 100 | 1.00 | 0 | 12.7 | 21.3 |
| 0 | 100 | 1.00 | 2.0 | 12.7 | 21.3 |
| 0 | 100 | 0.80 | 2.0 | 13.6 | 22.8 |
| 100 | 0 | 0.625 | 0 | 23.1 | 52.5 |
| 95 | 5 | 0.625 | 0 | 28.0 | 81.1 |
| 90 | 10 | 0.625 | 0 | 30.4 | 86.3 |
| 85 | 15 | 0.625 | 0 | 33.2 | 92.6 |
| 80 | 20 | 0.625 | 2.0 | 35.6 | 100.5 |
| 75 | 25 | 0.625 | 2.0 | 28.4 | 109.3 |
| 70 | 30 | 0.625 | 2.0 | 41.0 | 119.2 |

In the case of the tests, whose results are shown in the table, so-called "Saaralit mining gypsum D" is used as natural gypsum, essentially as a semi-hydrate. A flue gas desulfurizing gypsum dehydrated to a semi-hydrate was mixed to this natural gypsum, which was produced in the flue gas desulfurizing installation of the Weiher II power plant of the Saar Mining Co Inc.

The test results show that the bending strength as well as the compression strength which was determined in all tests after 13 days storage at 35° C. jumps considerably as soon as the smoke gas desulfurizing gypsum is added to the natural gypsum. For example, a mixture of 85 wt.% "mining gypsum D" and 15 wt.% Weiher semihydrate at a W:G ratio of 0.625 gives a compression strength of 92.6 daN/cm$^2$. A correspondingly high compression strength is to be attained with the use of "mining gypsum D" only at a small W:G ratio of 0.5, that is to say for example that with the use of mining gypsum for the production of 1 m$^3$ hardened gypsum, about 135 kg more gypsum must be used than with the use of a mixture of 85 wt.% "mining gypsum D" and 15 wt.% "Weiher semihydrate".

We claim:

1. Method for the use of flue gas desulfurizing gypsum occurring in flue gas desulfurizing installations operated on a lime basis, comprising mixing the flue gas desulfurizing gypsum with dehydrated natural gypsum after its partial or complete dehydration.

2. Method for the use of flue gas desulfurizing gypsum occurring in flue gas desulfurizing installations operated on a lime basis comprising mixing flue gas desulfurizing gypsum in with a natural gypsum in the form of dihydrate, and the dehydration to a semihydrate and/or anhydrite takes place together with the dehydration of natural gypsum.

3. Method according to claims 1 or 2 comprising providing the fraction of flue gas desulfurizing gypsum in the mixture between 5 and 50 wt.%, preferably between 5 and 30 wt.%.

4. Method according to claim 1, comprising using waste heat from a power plant for partial and/or complete dehydrating of the flue gs desulfurizing gypsum.

5. Method according to claim 2 comprising using waste heat from a power plant for dehydration of the mixture of flue gas desulfurizing gypsum and natural gypsum in the form of a dihydrate for said dehydration to a semi-hydrate and/or anhydrite.

* * * * *